Feb. 15, 1949.  D. K. MACLEOD  2,461,648
FASTENING
Filed July 23, 1945
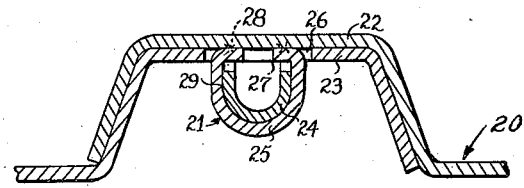
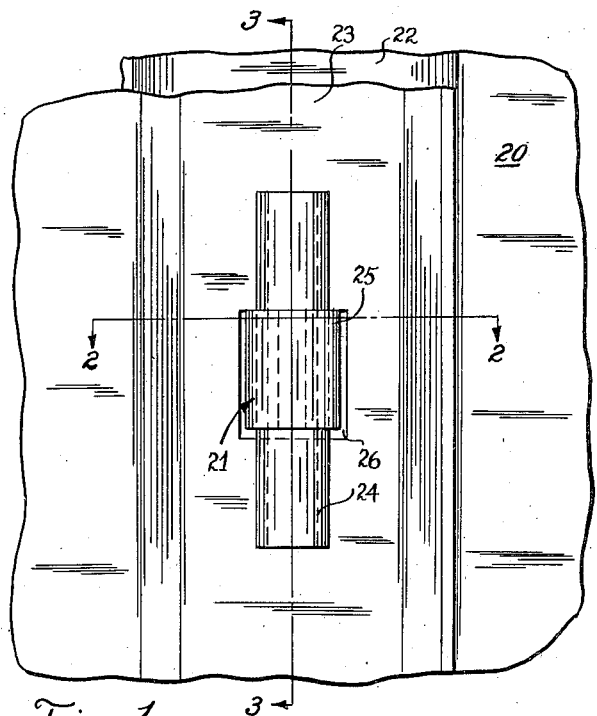
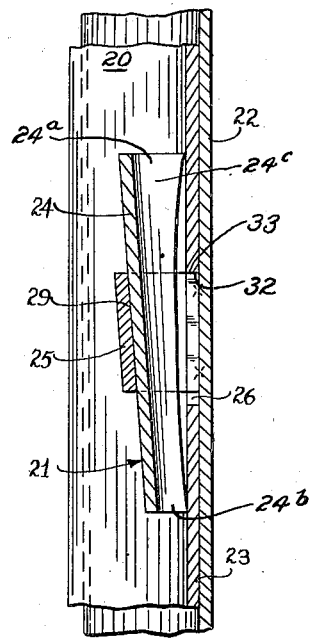
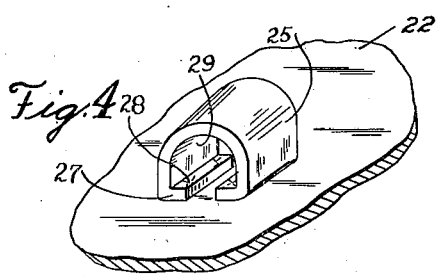
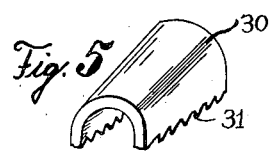
INVENTOR.
DONALD KEITH MACLEOD
BY
Kwis Hudson Baughton & Williams
ATTORNEYS Patented Feb. 15, 1949

2,461,648

UNITED STATES PATENT OFFICE 2,461,648

FASTENING

Donald Keith Macleod, Wooster, Ohio, assignor to United Steel Fabricators, Inc., Wooster, Ohio, a corporation of Ohio Application July 23, 1945, Serial No. 606,511

2 Claims. (Cl. 189—36)

This invention relates to fastenings and, more particularly, to fastenings for connecting superposed members or metal plates and which are readily applicable to various uses and building structures including roofs, culverts, building forms, and other structures.

An object of the present invention is to provide an improved fastening of this character embodying cooperating pin and clip elements and wherein the continuity of the upper or outer plate can be maintained unbroken so that leakage through the structure at the point of the fastening will be prevented.

Another object of this invention is to provide an improved fastening of the character mentioned, in which the clip is attached to the outer plate and extends through an opening of the inner plate and the retaining pin is tapered and wedgingly cooperates with the clip for drawing the plates tightly together.

A further object is to provide an improved fastening of the character referred to, in which the retaining pin is of a sheet metal construction and is of a form to cooperate with the clip and innermost plate in a manner to produce a tight and reliable connection without subjecting the structure to undue distortion or other damage.

The invention can be further briefly summarized as consisting in certain novel combinations and arrangements of parts hereinafter described and particularly set out in the appended claims.

In the accompanying sheet of drawings,

Fig. 1 is a view looking toward the inner surface of a roof or wall structure embodying the improved fastening of the present invention;

Fig. 2 is a partial transverse section taken through the structure on line 2—2 of Fig. 1;

Fig. 3 is a partial longitudinal section taken through the structure on line 3—3 of Fig. 1;

Fig. 4 is a partial perspective view further illustrating the clip embodied in the fastening of Fig. 1, and Fig. 5 is a detached perspective view showing another form of clip.

As already indicated above in a general way, the fastening 21 of the present invention can be used for connecting metal plates or various other members and, by way of example, Fig. 1 of the drawings shows a roof or wall structure 20 in which the fastening is embodied. As shown in Fig. 1 the structure 20 is formed by metal members or plates 22 and 23 disposed in superposed relation as is usual in roof constructions and the like. The plate 22 is located outwardly of or in overlapping relation to the plate 23 so as to more readily shed water. In this instance the plates 22 and 23 are transversely corrugated as illustrated in the drawings and are disposed with their corrugations in nested or interfitting engagement.

The fastening 21 is used at any suitable number of spaced points on the inside or underside of the structure 20 for connecting the overlapping portions of the plates 22 and 23 tightly together in such a manner that there will be no openings in the outermost plate 22 at the locations of the fastenings and through which rain or other liquid might leak. When the plates 22 and 23 are of a corrugated construction as mentioned above, the fastenings 21 are preferably located in the channel recesses of the corrugations.

As shown in Figs. 1 to 3 inclusive the fastening 21 comprises clip and pin elements 25 and 24 which cooperate with the outer and inner plates 22 and 23 in a manner to cause the overlapping portions of these plates to be drawn tightly together and to be reliably held in assembled relation. The clip 25 may be formed from sheet metal of suitable thickness and comprises a tubular member having an opening 29 through which the pin 24 extends as will be further explained hereinafter.

The inner plate 23, or plates in the event that there are a plurality of such inner plates or members, is provided with an opening 26 of a suitable size and shape to accommodate the clip 25 and through which the clip extends when the plates are in the assembled relation shown in Fig. 1. The outermost plate 22 extends continuously over the opening 26 of the inner plate or plates so as to form a cover or closure for such opening. The base of the clip 25 is attached to the inner side of the outermost plate 22, as by means of the spot welding indicated at 28. The opening 26 is preferably of a size and shape in relation to the size and shape of the base of the clip such that an edge 32 of the base will be engaged by a corresponding edge 33 of the opening 26 (see Fig. 3). The clip thus forms a stop for preventing shifting of the inner plate 23 relative to the outer plate 22. This feature is especially useful in roof constructions where the engagement of the uppermost edge of the opening 26 with the base of the clip is used to prevent downward shifting of the plate 23 relative to the plate 22.

The retaining pin 24 extends through the opening 29 of the clip, as mentioned above, and acts on the clip to draw the overlapping portions of the plates 22 and 23 into tight engagement with each other. The pin is preferably tapered and is of a greater length than the opening 29 so that its end portions 24a and 24b will bear on the underside of the innermost plate 23 on opposite sides of the opening thereof. An important feature of the present invention is that the pin 24 is bowed or cambered longitudinally thereof, that is, in a direction away from the overlapping plates so that only its end portions 24a and 24b will bear on the underside of the innermost plate 23. It is also important that the pin 24 is somewhat resilient because this characteristic assists in obtaining a wedging engagement of the pin in the clip. The wedging of the tapered pin in the opening of the clip also results, in part, from the fact that the connected plates 22 and 23 are usually made of relatively thin material such as the sheet metal shown in the drawings and the inward pull exerted on the clip by the tapered pin causes a limited amount of inward deflection or springing of the outer plate. As here shown, the pin can be made from sheet metal of appropriate thickness in which case it is of a hollow or substantially U-shaped cross-section with a rounded longitudinal top and with the above-mentioned bowed contour formed in the longitudinal edges of the spaced side walls 24c.

Fig. 1 of the drawings shows the plates 22 and 23 in the above described superposed or overlapping relation and with the clip 25 extending through the opening 26 of the innermost plate. The retaining pin 24 is shown as having been inserted through the opening 29 of the clip and is ready to be driven further into the clip for producing a wedging engagement therein and for drawing the overlapping portions of the plates tightly against each other. The tapered pin is preferably inserted into the opening of the clip in a direction such that the small end of the pin will extend downwardly and the force of gravity will tend to tighten the pin in the clip rather than loosen it. The pin can be driven into the clip by blows of a hammer or other suitable tool delivered against the large end of the pin. When the pin is thus driven into the clip it is subjected to some springing or deflection which reacts to pull the plates together and, as mentioned above, assists in producing the desired wedging engagement of the pin in the clip opening.

In the accompanying drawings the bowed contour or camber on the inner longitudinal edge or edges of the pin is somewhat exaggerated for the sake of clearness of the drawings. In actual practice this camber of the pin should be such that when the pin has been driven into the clip far enough to produce a tight wedging engagement in the clip opening and a tight engagement between the overlapping portions of the plates, the inner edge of the pin will engage either the top of the base of the clip or the lower edge of the clip opening and such engagement will serve as a stop for preventing further longitudinal movement of the pin in the clip opening. The height of the clip opening in relation to the corresponding height or dimension of the pin are also factors of this stop feature and assist in determining the extent to which the pin can be driven into the clip. The provision of this stop feature is important because if the pin were driven an excessive distance through the clip it would cause an undue stress to be applied to the clip which would result either in the clip being torn loose from the outer plate 22 or in one or both of the overlapping plates being bent or otherwise damaged. When the tapered retaining pin 24 has been driven into the clip in the manner above explained, its wedging engagement therein and the pressure of its ends on the inner plate ordinarily retain the pin in a locked condition for maintaining a tight engagement between the overlapping plates 22 and 23 although, if desired, the fastening can be easily and quickly released by driving the pin back out of the clip whenever this might be found desirable, such as when the fastening is being used in temporary or portable buildings or building forms.

The clip is in the form of a tapered tubular member which may be made from sheet metal of appropriate thickness. The clip is attached to the underside of the outermost plate 22 and, as mentioned above, extends through an opening 26 of the inner plate or plates 23. The clip has as its base a pair of inturned longitudinal edges or flanges 27 which are connected to the plate 22 by the spot welding 28. The taper of the clip opening 29 corresponds substantially with the taper of the pin so that a considerable bearing area will be obtained between the pin and clip by a wedging engagement therebetween which extends for the full length of the clip when the pin is driven into the latter.

Fig. 5 shows another clip 30 which is intended for the same purpose as the clip 25. The clip 30 is a tapered and transversely curved member which is serrated, as indicated at 31, along its longitudinal edges. This form of clip is intended to be connected to the outer sheet or plate by having its serrated edges pressure welded thereto.

From the foregoing description and the accompanying drawings, it will now be readily understood that this invention provides an improved fastening which is especially suitable for use in roofs and other building structures in which overlapping metal plates or other members are to be securely held together without requiring an opening to be formed in the outermost member and through which leakage of rain or other liquid might occur.

While my improved fastenings and their use have been illustrated and described herein in considerable detail it will be understood of course that the invention is not to be regarded as correspondingly limited in scope but is intended to include all changes and modifications coming within the spirit of the invention and the scope of the appended claims.

Having thus described my invention, I claim:

1. In a fastening of the character described, a pair of superposed sheet metal plates in face-to-face engagement of which the inner plate has an opening therein and the outer plate extends in continuous relation across said opening, a hollow sheet metal clip having a tapered opening therein and also having a greater dimension longitudinally of said tapered opening than it does transversely of the tapered opening, said clip being attached to said outer plate and projecting inwardly through the opening of said inner plate, and a tapered resilient retaining pin extending through and wedgingly engaged in the tapered opening of said clip and having its ends bearing on said inner plate on opposite sides of the opening thereof, said pin being formed of sheet metal and being transversely curved and being also longitudinally bowed in a direction away from said plates, the tapers of said clip and pin having substantially the same slope such that the wedging engagement therebetween is of large area and extends for substantially the full length of the clip.

2. In a fastening of the character described, a pair of superposed sheet metal plates in face-to-face engagement of which the inner plate has an opening therein and the outer plate extends in continuous relation across said opening, a hollow metal clip having a tapered opening therein and also having a greater dimension longitudinally of said tapered opening than it does transversely of the tapered opening, said clip being formed by a transversely curved sheet metal member and having opposed in-turned connecting portions extending along said tapered opening and formed by opposite edge portions of said sheet metal member, said connecting portions being attached to said outer plate for mounting said clip thereon and said clip projecting inwardly through the opening of said inner plate, and a tapered resilient retaining pin extending through and wedgingly engaged in the tapered opening of said clip and having its ends bearing on said inner plate on opposite sides of the opening thereof, said pin being formed of sheet metal and being transversely curved and being also longitudinally bowed in a direction away from said plates, the tapers of said clip and pin having substantially the same slope such that the wedging engagement therebetween is of large area and extends for substantially the full length of the clip.

DONALD KEITH MACLEOD.

REFERENCES CITED

The following references are of record in the file of this patent:

UNITED STATES PATENTS

| Number | Name | Date |
|---|---|---|
| 1,141,250 | Luten | June 1, 1915 |
| 1,261,598 | Northey | Apr. 2, 1918 |
| 1,315,568 | Neidhammer | Sept. 9, 1919 |
| 1,970,965 | Leake | Aug. 21, 1934 |
| 2,042,179 | Leake | May 26, 1936 |
| 2,112,178 | Selph | Mar. 22, 1938 |

FOREIGN PATENTS

| Number | Country | Date |
|---|---|---|
| 134,911 | Great Britain | 1919 |